No. 872,729. PATENTED DEC. 3, 1907.
G. HILLER.
MIXING MACHINE.
APPLICATION FILED NOV. 12, 1906.
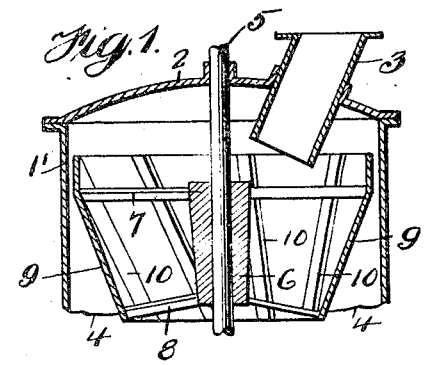
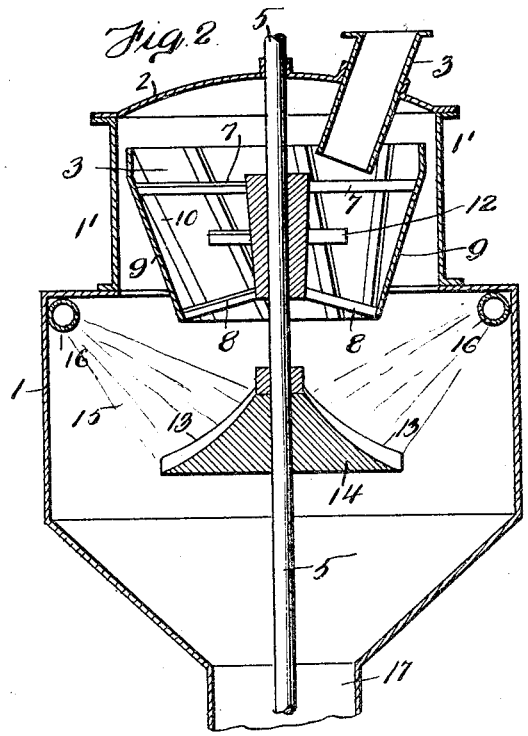
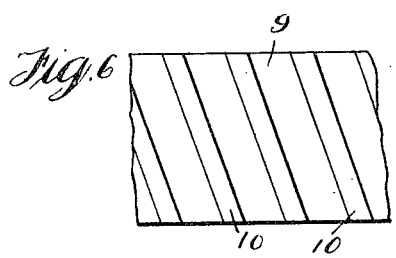
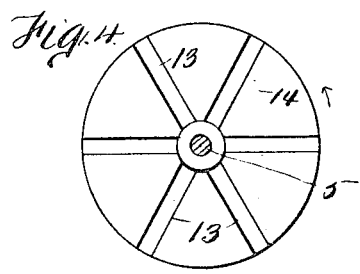
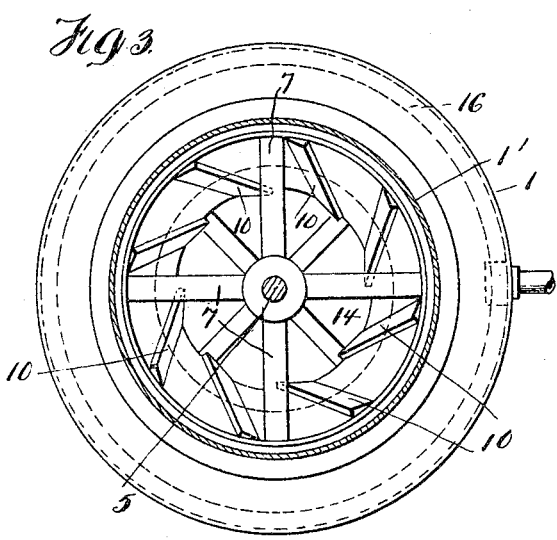
WITNESSES:
Samuel Payne
R. H. Butler
INVENTOR
Georg Hiller.
BY H. C. Everitt Co.
Attorneys

UNITED STATES PATENT OFFICE.

GEORG HILLER, OF TEPLITZ, AUSTRIA-HUNGARY.

MIXING-MACHINE.

No. 872,729.　　　Specification of Letters Patent.　　　Patented Dec. 3, 1907.

Application filed November 12, 1906. Serial No. 343,079.

*To all whom it may concern:*

Be it known that I, GEORG HILLER, engineer, citizen of Saxony, Germany, residing at Teplitz, Bohemia, Austria-Hungary, have invented certain new and useful Improvements in Mixing-Machines, of which the following is a specification, reference being had therein to the accompanying drawings.

This invention relates to certain new and useful improvements in mixing machines and relates more particularly to a mixing machine adapted for the mixing of concrete or similar mortar compounds.

The invention still more particularly defined, relates to a mixing machine for the mixing of mortar compounds in which the said compounds are moistened by water prior to discharge of the mixture from the mixing machine.

The invention has for its object the provision of novel means for the thorough agitating and mixing of ingredients in the mixer or mixing machine, and the subjecting of the thoroughly mixed ingredients or compounds to a uniform moistening.

The invention consists in the novel details of construction, combination and arrangement of parts to be hereinafter more fully described and then particularly pointed out in the claims, and in describing the invention in detail, reference will be had to the accompanying drawings showing a practical embodiment of the invention, and wherein like numerals of reference are employed to indicate like parts throughout the different views of the drawing, in which:—

Figure 1 is a central vertical sectional view of the upper portion of a mixing machine showing a preferred embodiment of mixer, or mixing drum. Fig. 2 is a central vertical sectional view of a mixing machine constructed in accordance with my invention, showing a slightly modified form of mixer or mixing drum. Fig. 3 is an enlarged cross sectional view of one of the beater-arms. Fig. 4 is a developed plan view of a part of the mixing drum. Fig. 5 is a horizontal sectional view taken on the line 5—5 of Fig. 4. Fig. 6 is an enlarged diagrammatic side view of a portion of the ribbed drum. Fig. 7 is a plan view of the same.

In the drawings, 1 represents a stationary casing or shell, the lower portion of which is tapered as clearly shown in Fig. 2, and terminates in the outlet 17. The upper portion 1' of said casing is of less diameter than the main portion 4 of the casing, and is provided with a suitable lid or cover 2, through which extends a spout 3, or other equivalent filling device.

Arranged centrally in the casing 1 is a vertical shaft 5, extending through the cover 2, and carrying, substantially within the portion 1' of the casing, a hub 6. To this hub is secured a plurality of radiating beater-arms 7, the said beater-arms being secured to the hub near the upper end of the latter, and secured to said hub adjacent its lower end, are a plurality of radiating arms or spokes 8 which have a slight inclination downwardly from a horizontal line. The said beater-arms 7 and the arms or spokes 8 support a drum 9 of substantially frusto-conical form and which is provided with beater-ribs 10, inclined to the horizontal plane of rotation, or, in other words, arranged obliquely to the center shaft 5, as shown in Fig. 4 of the drawings, and have preferably the cross section of a triangle, as clearly seen in Fig. 5 of the drawings. The hub 6 is also provided intermediate its ends, with radiating beater-arms 12, and these beater-arms 12, and also the beater arms 7 are all a peculiar form, as illustrated for one of the beater arms 7 in Fig. 3 of the drawings.

The planes 11 of the beater-arms are inclined to the horizontal plane of rotation, as indicated by the arrow in Fig. 3, whereby the material poured in through the spout or other inlet 3 will be thrown upward and outward as it strikes the beater-arms 7, and will then fall on to the beater ribs 9 of the drum and, owing to these beater ribs being arranged obliquely to the middle shaft, and turning in the direction indicated by the arrow in Fig. 4, the material will be thrown towards the center of the drum, where it will be engaged and further agitated by the beater-arms 12, and also by the spokes or arms 8, as it sifts through the latter.

As a result of the arrangement of the beater-arms, and the beater ribs, the material is caused to be thrown in different directions, and a thorough mixing thereof is attained before it is discharged from the beater-drum.

In order that the uniformly mixed compound upon its discharge from the mixing drum may be uniformly moistened, to place it in working condition upon its discharge from the casing 1, I provide on the shaft 5 at a suitable point below the mixing drum, a dispersing plate 13, substantially conical in form, and provided with arms or ribs 14 on its upper face, conforming in curvature to the curvature of the upper face of the plate. Arranged to operate in the casing 1 are one or more perforated water pipes 16, the perforations in which are so disposed or arranged as to direct the water onto the dispersing plate 13, as clearly illustrated in Fig. 1 of the drawings.

As the material drops from the mixing drum on to the dispersing plate 13, and is engaged by the ribs 14 of said plate, the material is thrown outwardly into the space 15 of the casing 1, and, during its suspension, is subjected to the spray of water from the pipes 16, and in its moistened state drops into the lower part of the casing 1, and, owing to the funnel-shaped form of the lower part of said casing, the moistened material is conducted to, and discharged through the outlet 17.

Having fully described my invention, what I claim as new, and desire to secure by Letters Patent is:—

1. In a mixing machine, the combination of a casing, a shaft arranged vertically therein, a mixing drum of substantially frusto-conical form mounted on the shaft, and embodying beater-arms arranged at an incline to the horizontal, and beater ribs on the drum arranged obliquely to the vertical shaft, a dispersing plate carried by the shaft below the mixing drum, and ribs on said plate adapted to throw the material outwardly within the casing, substantially as described.

2. In a mixing machine, the combination of a casing, a vertical shaft therein, a mixing drum embodying a hub secured to the shaft, beater-arms secured to said hub, spokes also secured to said hub, and a drum carried by said beater-arms and spokes and provided with beater ribs dispersed on the drum obliquely to the vertical shaft, a dispersing plate mounted on the shaft below the mixing drum, to receive the material as it is discharged from the drum, and means extending into the casing for moistening the mixed material received on the dispersing plate.

3. In a machine for mixing concrete or the like, the combination of a casing, a vertical shaft therein, a mixer mounted on the shaft and embodying a hub, beater-arms connected at their inner ends to said hub and arranged at an incline to the horizontal, spokes connected at their inner ends to said hub and also arranged at an incline to the horizontal, a drum carried by said beater arms and spokes, being of substantially frusto-conical form, and having beater ribs arranged obliquely to the vertical shaft, a dispersing plate carried at the shaft below the mixer, and means extending into the casing for moistening the material after it has passed the mixer.

In testimony whereof I affix my signature in the presence of two witnesses.

GEORG HILLER.

Witnesses:
 ADOLPH FISCHER,
 ARTHUR SCHURZ.